(12) United States Patent
Asahara et al.

(10) Patent No.: US 11,599,316 B2
(45) Date of Patent: Mar. 7, 2023

(54) ELECTRONIC APPARATUS AND NON-TRANSITORY COMPUTER-READABLE STORAGE MEDIUM

(71) Applicant: Seiko Epson Corporation, Tokyo (JP)

(72) Inventors: Tomo Asahara, Nagano (JP); Junpei Koizumi, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/462,858

(22) Filed: Aug. 31, 2021

(65) Prior Publication Data

US 2022/0066712 A1   Mar. 3, 2022

(30) Foreign Application Priority Data

Sep. 2, 2020   (JP) .............................. JP2020-147301

(51) Int. Cl.
| | | |
|---|---|---|
| *G06F 15/00* | (2006.01) | |
| *G06F 3/12* | (2006.01) | |
| *G06K 1/00* | (2006.01) | |
| *H04W 76/15* | (2018.01) | |

(52) U.S. Cl.
CPC ............ *G06F 3/1236* (2013.01); *G06F 3/121* (2013.01); *G06F 3/1292* (2013.01); *H04W 76/15* (2018.02)

(58) Field of Classification Search
CPC ...... G06F 3/1236; G06F 3/121; G06F 3/1292; H04W 76/15
USPC ............................... 358/1.15, 1.14, 1.13, 1.1
See application file for complete search history.

(56) References Cited

U.S. PATENT DOCUMENTS

| | | | |
|---|---|---|---|
| 11,336,796 B2* | 5/2022 | Tokumaru | H04N 1/00925 |
| 2019/0306707 A1* | 10/2019 | Shibata | H04W 12/0431 |
| 2019/0306713 A1 | 10/2019 | Yanagisawa et al. | |
| 2021/0298099 A1* | 9/2021 | Suzuki | H04W 88/06 |
| 2021/0306943 A1* | 9/2021 | Suzaki | G06F 3/1292 |

FOREIGN PATENT DOCUMENTS

JP    2019-176451    10/2019

* cited by examiner

*Primary Examiner* — Douglas Q Tran
(74) *Attorney, Agent, or Firm* — Workman Nydegger

(57) ABSTRACT

An electronic apparatus includes a wireless communication section configured to perform first wireless communication or second wireless communication that is short-range wireless communication having a slower communication speed than the first wireless communication and includes a processor configured to perform communication control on the wireless communication section and perform control on job processing. The processor connects to an information processing apparatus for communication by using the second wireless communication to receive initial setting information for setting a state for enabling the job processing and receive connection setting information for connecting to an external access point by using the first wireless communication.

8 Claims, 14 Drawing Sheets ated by
ELECTRONIC APPARATUS AND NON-TRANSITORY COMPUTER-READABLE STORAGE MEDIUM The present application is based on, and claims priority from JP Application Serial Number 2020-147301, filed Sep. 2, 2020, the disclosure of which is hereby incorporated by reference herein in its entirety.

BACKGROUND

1. Technical Field

The present disclosure relates to an electronic apparatus and a non-transitory computer-readable medium storing a program.

2. Related Art

An information processing apparatus such as a portable terminal can be connected to an electronic apparatus such as a printing apparatus by using a variety of wireless communication technologies. JP-A-2019-176451 discloses a system in which an information processing apparatus can be connected to an electronic apparatus for wireless communication via a wireless local area network (LAN) by operating the information processing apparatus.

However, such a wireless communication connection via a wireless LAN is susceptible to failure. Without a wireless communication connection, initial setup for an electronic apparatus cannot be performed by operating an information processing apparatus, resulting in inconvenience; for example, it may not be possible to set up an electronic apparatus quickly. The method described in JP-A-2019-176451 may have room for improvement to address such a problem.

SUMMARY

According to an aspect of the present disclosure, an electronic apparatus includes a wireless communication section configured to perform first wireless communication or second wireless communication that is short-range wireless communication having a slower communication speed than the first wireless communication, and includes a processing section configured to perform communication control on the wireless communication section and perform control on job processing. The processing section connects to an information processing apparatus for communication by using the second wireless communication to receive initial setting information for setting a state for enabling the job processing and receive connection setting information for connecting to an external access point by using the first wireless communication.

According to another aspect of the present disclosure, a non-transitory computer-readable medium storing a program for causing an information processing apparatus to operate as a wireless communication section that performs first wireless communication or second wireless communication that is short-range wireless communication having a slower communication speed than the first wireless communication and to operate as a processing section that performs communication control on the wireless communication section is provided. The program includes connecting to an electronic apparatus by using the second wireless communication, transmitting, by using the second wireless communication, initial setting information for causing the electronic apparatus to be ready for job processing, and transmitting, by using the second wireless communication, connection setting information for causing the electronic apparatus to perform the first wireless communication.

DESCRIPTION OF EXEMPLARY EMBODIMENTS

Hereinafter, an embodiment is described. It is to be understood that the embodiment described below does not necessarily limit the scope of the disclosure described in the claims, and not all of the configurations described in the embodiment are essential for the present disclosure.

1. Basic Configuration

Figure 1:
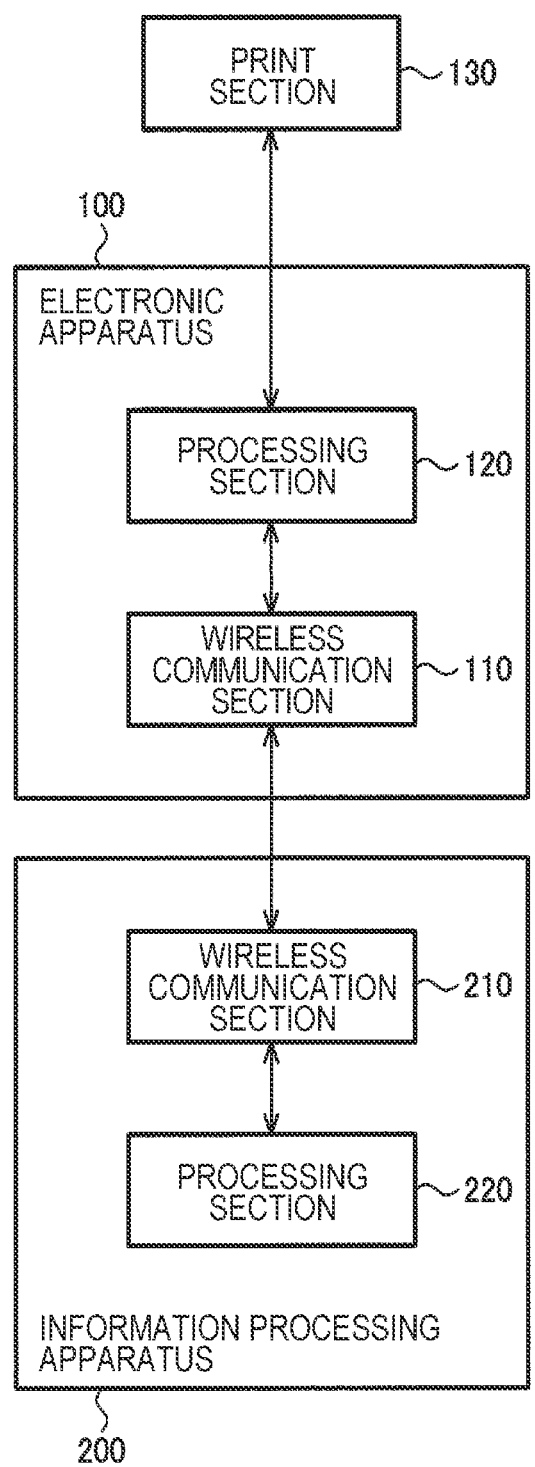
FIG. 1 is a block diagram illustrating a configuration of an electronic apparatus.
Figure 2:
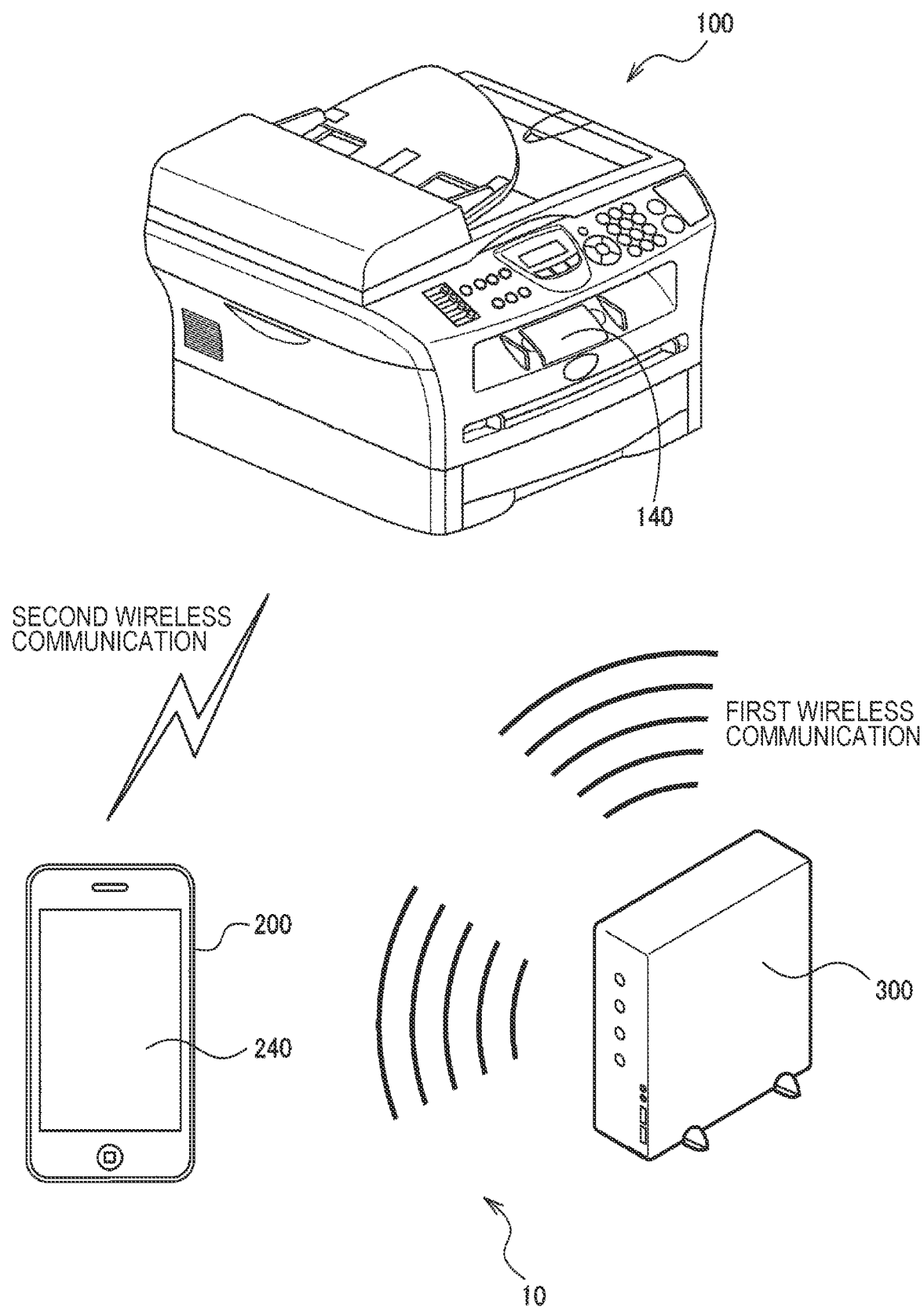
FIG. 2 illustrates a wireless communication system configuration.
Figure 3:
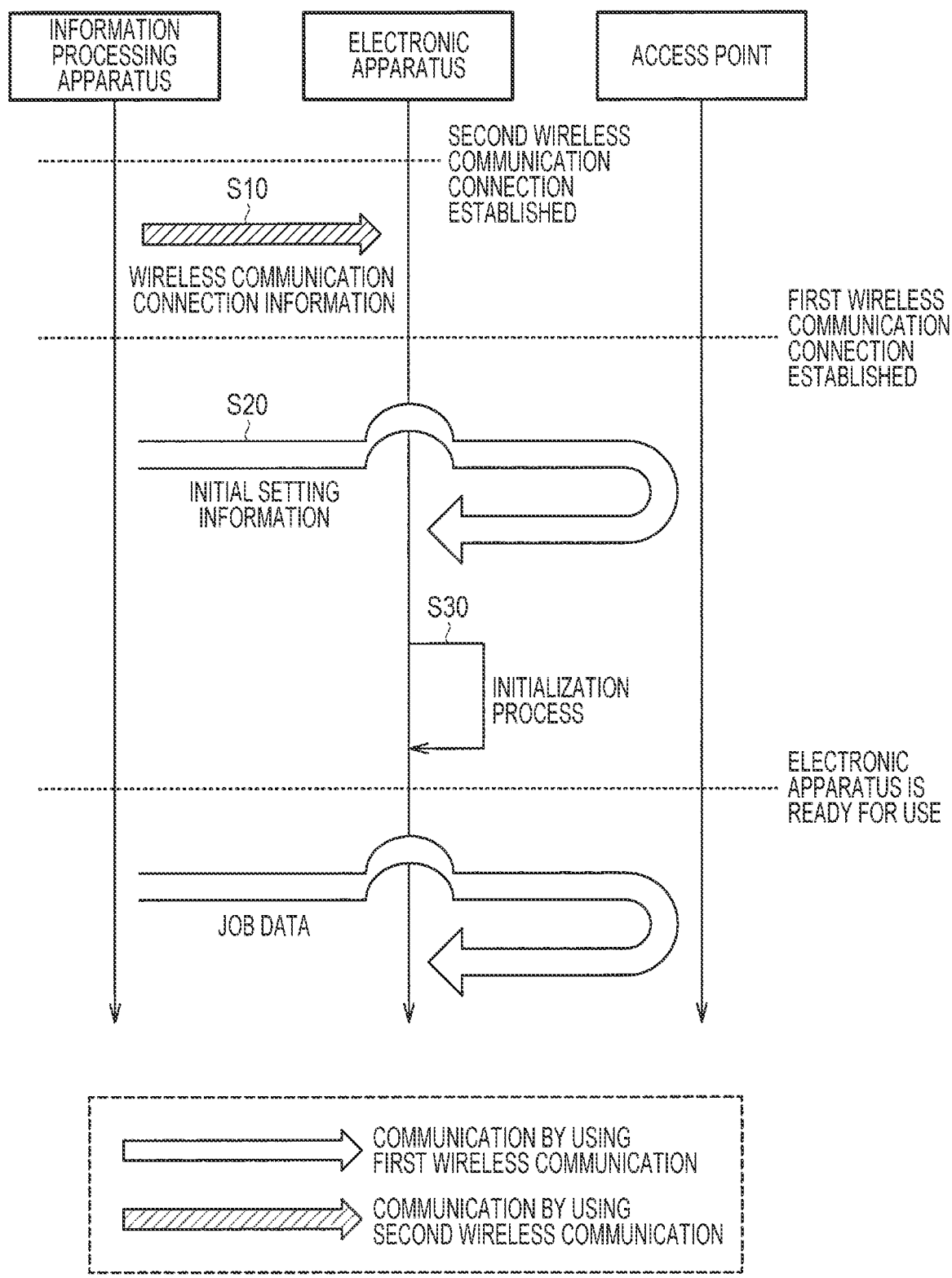
FIG. 3 illustrates a flow of processing in a comparative example.

An electronic apparatus 100 according to an embodiment is described with reference to FIG. 1 and FIG. 2. FIG. 1 is a block diagram illustrating a configuration of the electronic apparatus 100 according to the embodiment. FIG. 2 illustrates a configuration of a wireless communication system 10 that includes the electronic apparatus 100 according to the embodiment. FIG. 3 illustrates a comparative example to which the method described in JP-A-2019-176451 is applied. The electronic apparatus 100 according to the embodiment includes a wireless communication section 110 and a processing section 120 as illustrated in FIG. 1. The electronic apparatus 100 is, for example, a printer, which will be described later; however, the electronic apparatus 100 may be a personal computer, a wearable device, a biological information measurement device, a robot, an imaging device, a physical instrument, or the like. Wearable devices include smart watches and activity trackers. Biological information measurement devices include pulsimeters and pedometers. Imaging devices include cameras and projectors. Physical instruments include thermometers and weighing machines. The printer herein may be a multifunction peripheral.

Multifunction peripherals are printers that have a plurality of functions including a printing function; functions other than the printing function include copying, faxing, and scanning but may include other functions.

The wireless communication section 110 communicates by radio with an information processing apparatus 200. The information processing apparatus 200 will be described later. The wireless communication section 110 may be a semiconductor device that has a function of wireless communication and that is compliant with a wireless communication standard. The wireless communication section 110 may be a single semiconductor device that has a function of wireless communication or may be implemented as a function of a semiconductor device that has other functions. The wireless communication section 110 is capable of performing wireless communication in accordance with a plurality of wireless communication standards; for example, the wireless communication section 110 is capable of performing first wireless communication or second wireless communication. The first wireless communication here complies with a standard having a faster communication speed than a standard with which the second wireless communication, which will be described later, complies. The first wireless communication complies with a wireless local area network (LAN) standard such as Wi-Fi (registered trademark) or may comply with other communication standards. The second wireless communication here complies with a standard having a slower communication speed than a standard with which the first wireless communication complies. The standard used in the second wireless communication is, for example, Bluetooth (registered trademark) but may be Bluetooth Low Energy (BLE) or wireless communication complying with other communication methods. That is, the electronic apparatus 100 according to the embodiment includes the wireless communication section 110 that is capable of performing the first wireless communication or the second wireless communication that is short-range wireless communication having a slower communication speed than the first wireless communication.

When the first wireless communication complies with, for example, the above-mentioned Wi-Fi (registered trademark) standard, the electronic apparatus 100 and the information processing apparatus 200 are connected to each other by using the first wireless communication via an access point 300 as illustrated in FIG. 2. The access point 300 in FIG. 2 here periodically transmits a radio wave for wireless communication such as a beacon to provide information to enable identification of the access point 300. The identification information for the access point 300 is, for example, a service set identifier (SSID). The electronic apparatus 100 and the information processing apparatus 200 can be connected to the access point 300 by using a password entered by the user when receiving a radio wave from the access point 300. When the electronic apparatus 100 and the information processing apparatus 200 are reconnected to the same access point 300, the apparatuses can be automatically reconnected to the access point 300 without the user having to reenter the password. The access point 300 may be referred to as a router. In this embodiment, the expression "communication connection that complies with a communication standard" may be denoted simply as "connection" as appropriate; in addition, an electrical connection may also be denoted simply as "connection". The configuration of the wireless communication system 10 is not limited to the configuration in FIG. 2, and various modifications may be made; for example, other components may be added. For example, any number of access points 300 may be connected to the electronic apparatus 100, or any number of information processing apparatuses 200 may be connected to the access point 300. The electronic apparatus 100 and/or the information processing apparatus 200 may be associated with networks of a plurality of access points 300. In the following description, the expression "associated with a network" may be denoted as "associated with" as appropriate.

When the second wireless communication complies with, for example, the Bluetooth (registered trademark) standard, the electronic apparatus 100 and the information processing apparatus 200 are connected to each other by using the second wireless communication without using the access point 300. For example, the information processing apparatus 200 can establish a connection with the electronic apparatus 100 by using the second wireless communication by performing pairing processing with the electronic apparatus 100 in accordance with the Bluetooth (registered trademark) standard. When the information processing apparatus 200 is reconnected to the same electronic apparatus 100 by using the second wireless communication, the information processing apparatus 200 can be automatically reconnected to the electronic apparatus 100 without the user having to enter a password.

The block diagram in FIG. 1 is further described below. A processing section 120 controls components in the electronic apparatus 100, such as the wireless communication section 110. The processing section 120 receives a predetermined job from the information processing apparatus 200 via the wireless communication section 110 and processes the job. That is, the electronic apparatus 100 according to the embodiment includes the processing section 120 that performs communication control on the wireless communication section 110 and performs job processing control. The job here includes, for example, a process to be performed by the processing section 120 in the electronic apparatus 100 in accordance with a command or instruction issued to the electronic apparatus 100 by the information processing apparatus 200 or other external apparatuses. Jobs received without using the wireless communication section 110 can be processed by the processing section 120. The jobs received without using the wireless communication section 110 include, for example, jobs received by using wired networks (not illustrated) and jobs received in accordance with operations via an operation section (not illustrated). In this embodiment, it is assumed that the size of job data is large, and the job data can be transmitted from the information processing apparatus 200 to the electronic apparatus 100 by using the first wireless communication, whereas it is difficult to transmit the job data from the information processing apparatus 200 to the electronic apparatus 100 by using the second wireless communication.

The processing section 120 is, for example, a processor or a controller. The processing section 120 may include a plurality of central processing units, such as a primary CPU and a secondary CPU. The primary CPU controls components in the electronic apparatus 100 and performs overall control. The secondary CPU performs, for example, communication control on the wireless communication section 110. When the electronic apparatus 100 is a printer, a CPU for performing a variety of print processes may also be provided. The processing section 120 according to the embodiment includes the following hardware. The hardware includes at least one of a circuit that processes digital signals and a circuit that processes analog signals. The hardware includes, for example, one or more circuit devices or one or more circuit components mounted on a circuit board. The circuit device is, for example, an integrated circuit device. The circuit component is, for example, a resistor or a capacitor.

The processing section 120 may be implemented by the following processor. The electronic apparatus 100 according to the embodiment includes a memory that stores information and a processor that operates in accordance with the information stored in the memory. The information includes, for example, a program and various kinds of data. The processor includes hardware, and the processor may be various types of processor, such as a CPU, a graphics processing unit (GPU), or a digital signal processor (DSP). The memory may be a semiconductor memory such as static random access memory (SRAM) or dynamic random access memory (DRAM), a register, a magnetic storage device such as a hard disk device, or an optical storage device such as an optical disc device. The memory stores, for example, computer-readable instructions, and the instructions may be executed by the processor to implement the function of the processing section 120 as processing. The instructions may be a set of instructions constituting a program or instructions for causing a hardware circuit in the processor to perform an operation. A part or all of the processing section 120 may be implemented by cloud computing. When a job is transmitted from the information processing apparatus 200 associated with the access point 300, the processing section 120 according to the embodiment performs a process of storing the information about identification of the access point 300 and the information about identification of the information processing apparatus 200 in a storage section (not illustrated).

As described above, the electronic apparatus 100 includes the wireless communication section 110 that is capable of performing the first wireless communication or the second wireless communication that is short-range wireless communication having a slower communication speed than the first wireless communication and includes the processing section 120 that performs communication control on the wireless communication section 110 and performs job processing control. With this configuration, a job can be processed appropriately by the use of a method using the first wireless communication or the second wireless communication for the electronic apparatus 100. The method using the first wireless communication or the second wireless communication includes, for example, a method using the second wireless communication to identify an electronic apparatus 100 that is nearest to the information processing apparatus 200 and then using the first wireless communication to transmit job data to the electronic apparatus 100.

FIG. 3 illustrates a comparative example in which the method described in JP-A-2019-176451 is applied to the wireless communication system 10 according to the embodiment. First, although not illustrated, the information processing apparatus 200 and the electronic apparatus 100 are connected to communicate via the second wireless communication in accordance with a standard with which the second wireless communication complies. More specifically, pairing processing is performed on the information processing apparatus 200 and the electronic apparatus 100 in accordance with, for example, the Bluetooth (registered trademark) standard. The pairing processing establishes a second wireless communication connection between the information processing apparatus 200 and the electronic apparatus 100. After the pairing processing, wireless communication connection information is transmitted from the information processing apparatus 200 to the electronic apparatus 100 (step S10). The wireless communication connection information is information required to establish a first wireless communication connection between the information processing apparatus 200 and the electronic apparatus 100; for example, the wireless communication connection information is an SSID and a password for the access point 300. After the first wireless communication connection via the access point 300 is established between the information processing apparatus 200 and the electronic apparatus 100, initial setting information is transmitted from the information processing apparatus 200 to the electronic apparatus 100 by using the first wireless communication (step S20). The electronic apparatus 100 receives the initial setting information and performs an initialization process (step S30). The processing enables the electronic apparatus 100 to be ready for use. The processing enables job data to be transmitted from the information processing apparatus 200 to the electronic apparatus 100 by using the first wireless communication, thereby enabling the electronic apparatus 100 to process the job transmitted from the information processing apparatus 200.

In the comparative example, however, when the first wireless communication connection is not established, the initialization process (step S30) is not performed. In addition, the first wireless communication tends to result in communication connection errors for various reasons. Accordingly, it is difficult to set up the electronic apparatus 100 stably by operating the information processing apparatus 200, which is inconvenient. However, the known art fails to consider such a case. Reasons for such include a mismatch between a password and an SSID, a connection to an unintended access point, a connection by an unsupported security method, and the like.

To address such problems, the processing section 120 in the electronic apparatus 100 according to the embodiment connects to the information processing apparatus 200 for communication by using the second wireless communication to receive the initial setting information for setting a state for enabling job processing and to receive the connection setting information for connecting to the external access point 300 by using the first wireless communication; this processing will be described in detail below. With this configuration, the initial setting information is received from the information processing apparatus 200 by using the second wireless communication, which results in fewer connection errors, thereby ensuring completion of the initialization processing for the electronic apparatus 100 even if the communication environment of the first wireless communication deteriorates. Accordingly, the job can be processed by a method other than the first wireless communication applied to the electronic apparatus 100, thereby increasing the convenience of the electronic apparatus 100.

The configuration of the electronic apparatus 100 according to the embodiment is not limited to the above-described configuration, and various modifications may be made; for example, other components may be added. For example, in FIG. 1, the electronic apparatus 100 is connected to an external print section 130 and print data is transmitted from the electronic apparatus 100 to the print section 130; however, when the electronic apparatus 100 is a printer, the print section 130 may be included in the electronic apparatus 100. The print section 130 prints an image on a print medium such as paper and the print section 130 may be, for example, a print mechanism. The print mechanism may be an ink jet discharge head or may be a drive mechanism for a carriage that includes the discharge head. The print mechanism discharges ink from the discharge head onto a print medium transported by a transport mechanism to print an image on the print medium. The print mechanism may be a laser print mechanism that prints by using toner.

The electronic apparatus 100 according to the embodiment may include a display section 140 illustrated in FIG. 2, a storage section, an operation section, or a notification section not illustrated in FIG. 1. The display section 140 may be a display for displaying various kinds of information for users. More specifically, the display section 140 may be a liquid crystal display, an organic electro luminescence (EL) display, or a dot matrix light-emitting diode (LED). The storage section stores information about the electronic apparatus 100. The information includes, for example, records of jobs from the information processing apparatus 200 or may include other information. The records of jobs include, for example, information on identification of the access point 300, information on identification of the information processing apparatus 200, job types, operation amounts, or job execution times but may be other records. The job types include, for example, print and facsimile. The operation amounts may be, when the electronic apparatus 100 is a printer, the number of printed sheets, the amount of ink consumed, or the like. The operation section may be implemented by the use of components for receiving input operations from users, such as buttons, a keyboard, a touch sensor, or a voice input microphone. The display section 140 and the operation section may be integrated into hardware, such as a touch panel. The notification section provides the user with information about the electronic apparatus 100. The notification section may be implemented by the use of a loudspeaker, a vibrating motor, a piezoelectric element, an LED, a fluorescent lamp, or a combination of components. A notification of the electronic apparatus 100 may be performed by the use of both the display section 140 and the notification section.

Hereinafter, the information processing apparatus 200 is described. The information processing apparatus 200 is, for example, a personal digital assistant, such as a smartphone, or may be a personal computer or another device. The information processing apparatus 200 includes a wireless communication section 210 and a processing section 220 as illustrated in FIG. 1. The information processing apparatus 200 may include a display section 240 as illustrated in FIG. 2 or may include a storage section, an operation section, and/or a notification section (not illustrated). The wireless communication section 210 can wirelessly communicate with an external device by using the first wireless communication or the second wireless communication similarly to the above-described wireless communication section 110 in the electronic apparatus 100. The information processing apparatus 200 transmits data including identification information unique to the information processing apparatus 200 in accordance with a wireless communication standard. The identification information unique to the information processing apparatus 200 is, for example, an Internet Protocol (IP) address or a media access control address (MAC) address. Accordingly, when a plurality of information processing apparatuses 200 are associated with the access point 300, the information processing apparatuses 200 can be distinguished from each other. The specific configuration of the wireless communication section 210 is similar to that of the wireless communication section 110 in the electronic apparatus 100, and thus detailed description of the configuration is omitted.

The processing section 220 controls the wireless communication section 210 and may also control the display section 240, a storage section, an operation section, or a notification section (not illustrated). The specific configuration of the processing section 220 is similar to that of the processing section 120 in the electronic apparatus 100, and detailed description of the configuration is omitted.

2. Method According to the Embodiment

Figure 4:
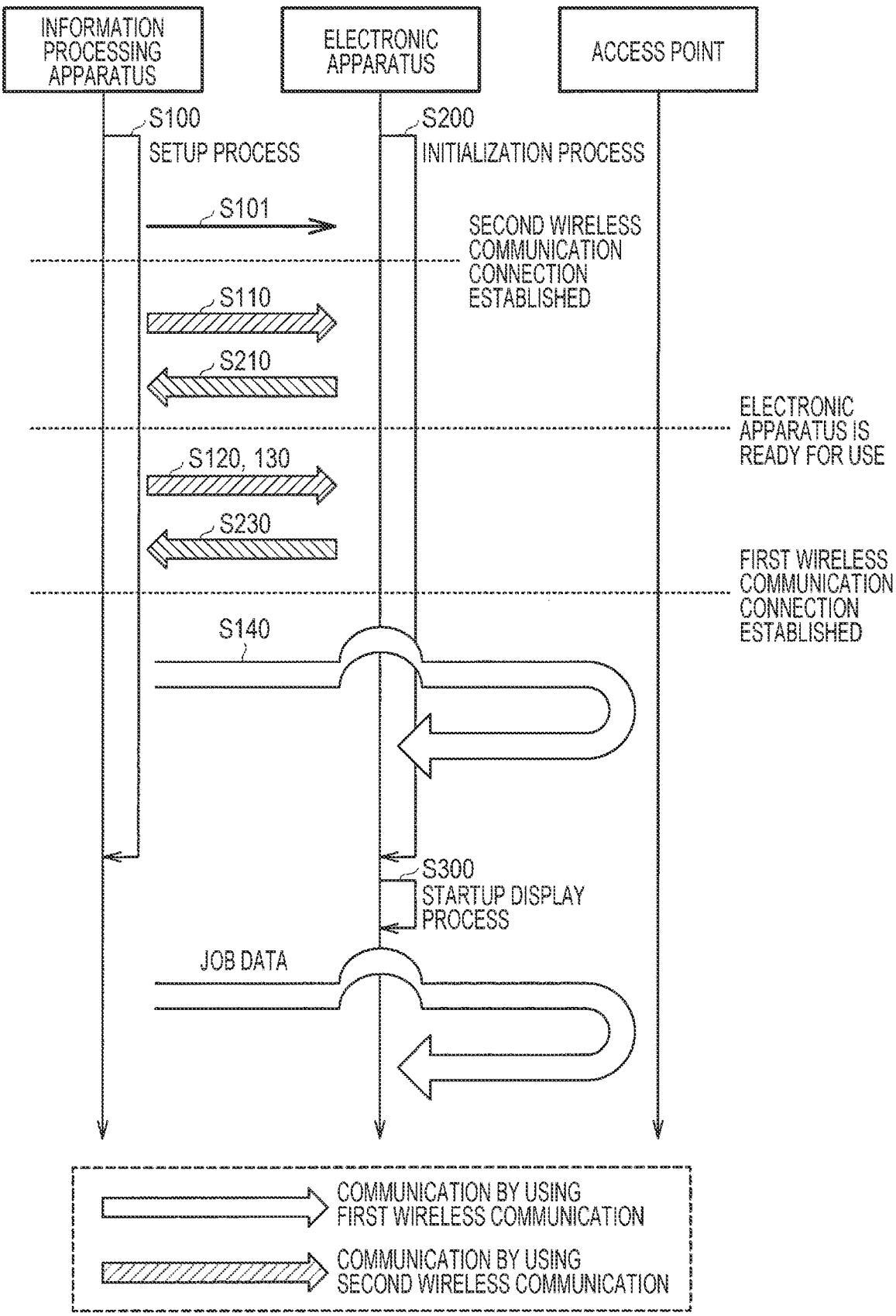
FIG. 4 illustrates a flow of processing according to the embodiment.

FIG. 4 illustrates a flow of the processing to which the method according to the embodiment is applied, the processing being performed between the electronic apparatus 100 and the information processing apparatus 200. The user operates the information processing apparatus 200 to execute a setup process (step S100), which is described later in detail with reference to FIG. 5. For example, the user installs a dedicated application program for setup on the information processing apparatus 200, and the processing section 220 in the information processing apparatus 200 executes the application program to perform the setup process (step S100). The setup process (step S100) is, accordingly, a program for the processing section 220 to activate the information processing apparatus 200. As described above, the processing section 220 in the information processing apparatus 200 performs communication control on the wireless communication section 210 that performs the first wireless communication or the second wireless communication. That is, the program according to the embodiment is a program that causes the information processing apparatus 200 to operate as the wireless communication section 210 that is capable of performing the first wireless communication or the second wireless communication that is short-range wireless communication having a slower communication speed than the first wireless communication and to operate as the processing section 220 that performs communication control on the wireless communication section 210.

Figure 9:
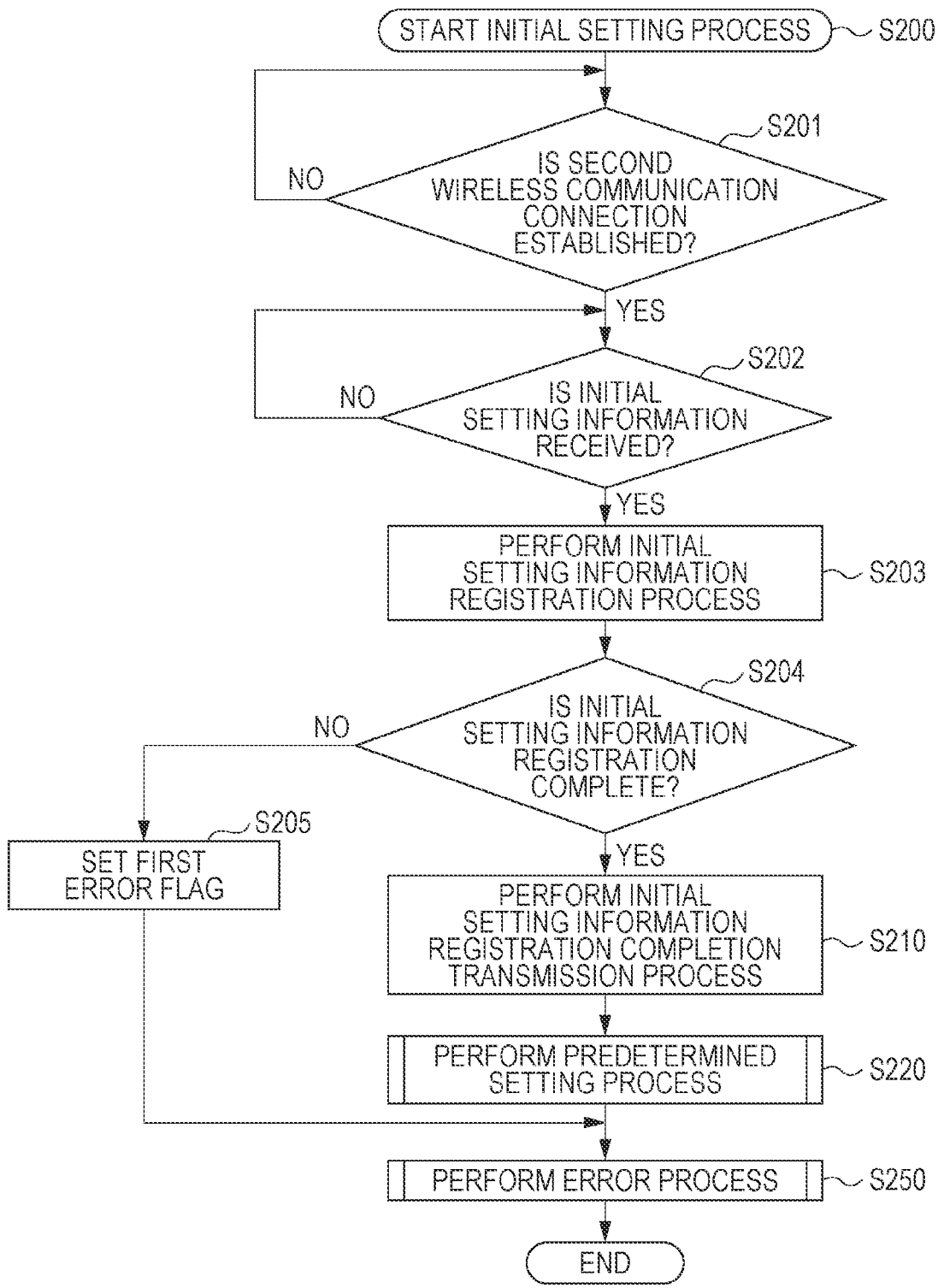
FIG. 9 is a flowchart illustrating example initialization processing.

After the power is switched on, the electronic apparatus 100 performs an initialization process (step S200), which will be described later with reference to FIG. 9 and other drawings. The process may be incorporated in a main program after the power is switched on, may be implemented by executing a timer interrupt process at predetermined intervals, or may be implemented by other methods. The information processing apparatus 200 performs an initial setting information transmission process (step S110) in the setup process (step S100) to transmit initial setting information to the electronic apparatus 100. After the initialization process is complete, the electronic apparatus 100 performs an initial setting information completion notification process (step S210) to transmit initial setting completion information to the information processing apparatus 200. The processing completes the initialization process of the electronic apparatus 100, and the electronic apparatus 100 becomes ready for use. The state in which the electronic apparatus 100 becomes ready for use is a state in which the electronic apparatus 100 is capable of processing a job. For example, when the electronic apparatus 100 is a printer, the electronic apparatus 100 can perform a print operation, when a projector, the electronic apparatus 100 can perform a projection operation, or when a scanner, the electronic apparatus 100 can perform a reading operation.

After completion of the initialization process, the information processing apparatus 200 performs a connection setting information transmission process (step S130) in the setup process (step S100) to transmit connection setting information to the electronic apparatus 100. The electronic apparatus 100 receives the connection setting information. That is, the processing section 120 in the electronic apparatus 100 according to the embodiment receives the connection setting information after the initialization process is executed in accordance with the initial setting information.

The processing enables the initialization process of the electronic apparatus 100 to be performed before the connection process is performed by using the first wireless communication that tends to result in more connection errors, thereby ensuring completion of the initialization process for the electronic apparatus. After the processing, if there is no connection problem, the connection is established by using the first wireless communication. Connection problems include, for example, a case in which a condition for establishing a wireless communication connection is not satisfied, and more specifically, a mismatch between an SSID and a password, but may include other cases. As will be described in detail below, when a connection is present between the processing section 120 in the electronic apparatus 100 and the print section 130, a filling instruction information transmission process (step S120) may be made before the connection setting information transmission process (step S130) is performed.

After the connection of the first wireless communication is established, the information processing apparatus 200 performs an optional setting information transmission process (step S140) to transmit optional setting information to the electronic apparatus 100, and the electronic apparatus 1v00 receives the optional setting information. The optional setting information is information other than minimum information required to activate the electronic apparatus 100 among the information set on the electronic apparatus 100, and the optional setting information differs from the initial setting information. That is, after the processing section 120 in the electronic apparatus 100 according to the embodiment is connected to the access point 300 by using the first wireless communication in accordance with the connection setting information, the processing section 120 receives the optional setting information about the setting items different from the initial setting information by using the first wireless communication. The processing ensures completion of the initialization process for the electronic apparatus 100 and enables more information to be set by using the first wireless communication, thereby increasing the convenience of the electronic apparatus 100. The electronic apparatus 100 in which the initialization process (step S200) is complete performs a startup display process (step S300). The startup display process (step S300) will be described later with reference to FIG. 13. It should be noted that when the electronic apparatus 100 does not become ready for use, the startup display process (step S300) is not performed. After the processing, the user operates the information processing apparatus 200 to transmit job data of the information processing apparatus 200 from the information processing apparatus 200 to the electronic apparatus 100 via the access point 300 by using the first wireless communication. That is, the processing section 120 in the electronic apparatus 100 according to the embodiment controls the job data reception by using the first wireless communication instead of the second wireless communication. The processing ensures completion of the initialization process for the electronic apparatus 100 and enables the job data transmission by using the first wireless communication having a faster communication speed, thereby increasing the convenience of the electronic apparatus 100.

Figure 5:
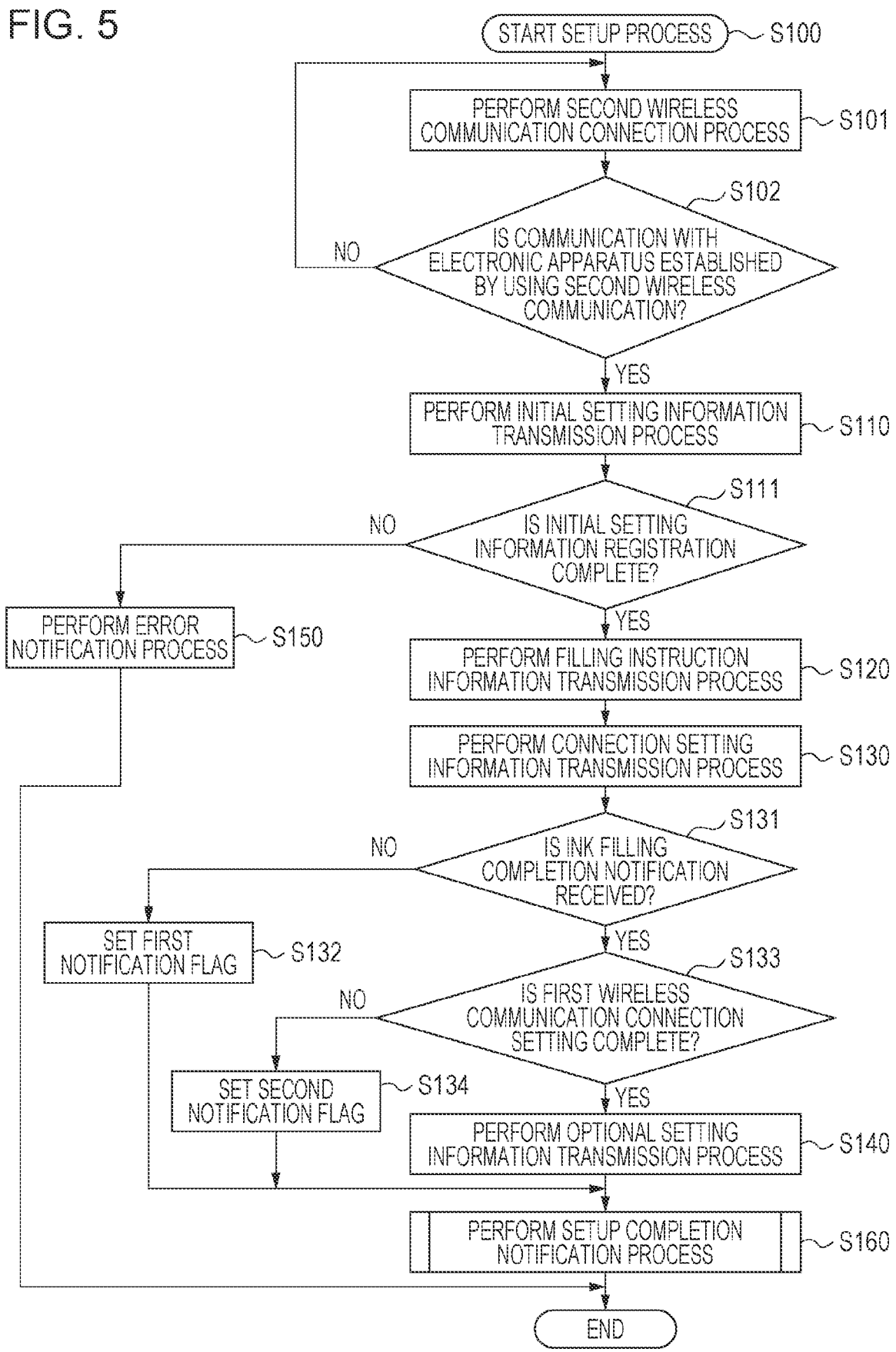
FIG. 5 is a flowchart illustrating example setup processing.

Next, the setup process (step S100) performed by the information processing apparatus 200 is described with reference to FIG. 5 and other drawings. The processing section 220 in the information processing apparatus 200 performs a second wireless communication connection process (step S101). More specifically, a process for establishing a second wireless communication connection between the wireless communication section 210 in the information processing apparatus 200 and the wireless communication section 110 in the electronic apparatus 100 is performed. For example, an operation for enabling the second wireless communication function is performed in the information processing apparatus 200 and the above-described pairing process for the information processing apparatus 200 and the electronic apparatus 100 is performed to implement the second wireless communication connection process (step S101). That is, the program according to the embodiment includes the process in step S101 for connecting to the electronic apparatus 100 by using the second wireless communication.

Next, when a connection is established between the information processing apparatus 200 and the electronic apparatus 100 by using the second wireless communication (YES in step S102), the processing section 220 in the information processing apparatus 200 performs the above-described initial setting information transmission process (step S110). In FIG. 5, the processing section 220 in the information processing apparatus 200 reperforms the process in step S101 when a connection is not established between the information processing apparatus 200 and the electronic apparatus 100 by using the second wireless communication (NO in step S102). However, for example, when no connection is established by using the second wireless communication after a predetermined period has passed, a predetermined error notification may be made. It is assumed that, under normal conditions, a connection is established by using the second wireless communication, although there are some exceptions. The same applies to the following description. Exceptions include a case in which the information processing apparatus 200 and the electronic apparatus 100 are apart by more than a predetermined distance, as well as other cases. In the initial setting information transmission process (step S110), the processing section 220 in the information processing apparatus 200 transmits the initial setting information to the electronic apparatus 100, and the electronic apparatus 100 receives the initial setting information. That is, the program according to the embodiment includes the process in step S110 for transmitting the initial setting information for causing the electronic apparatus 100 to become ready for use for job processing by using the second wireless communication.

Figure 6:
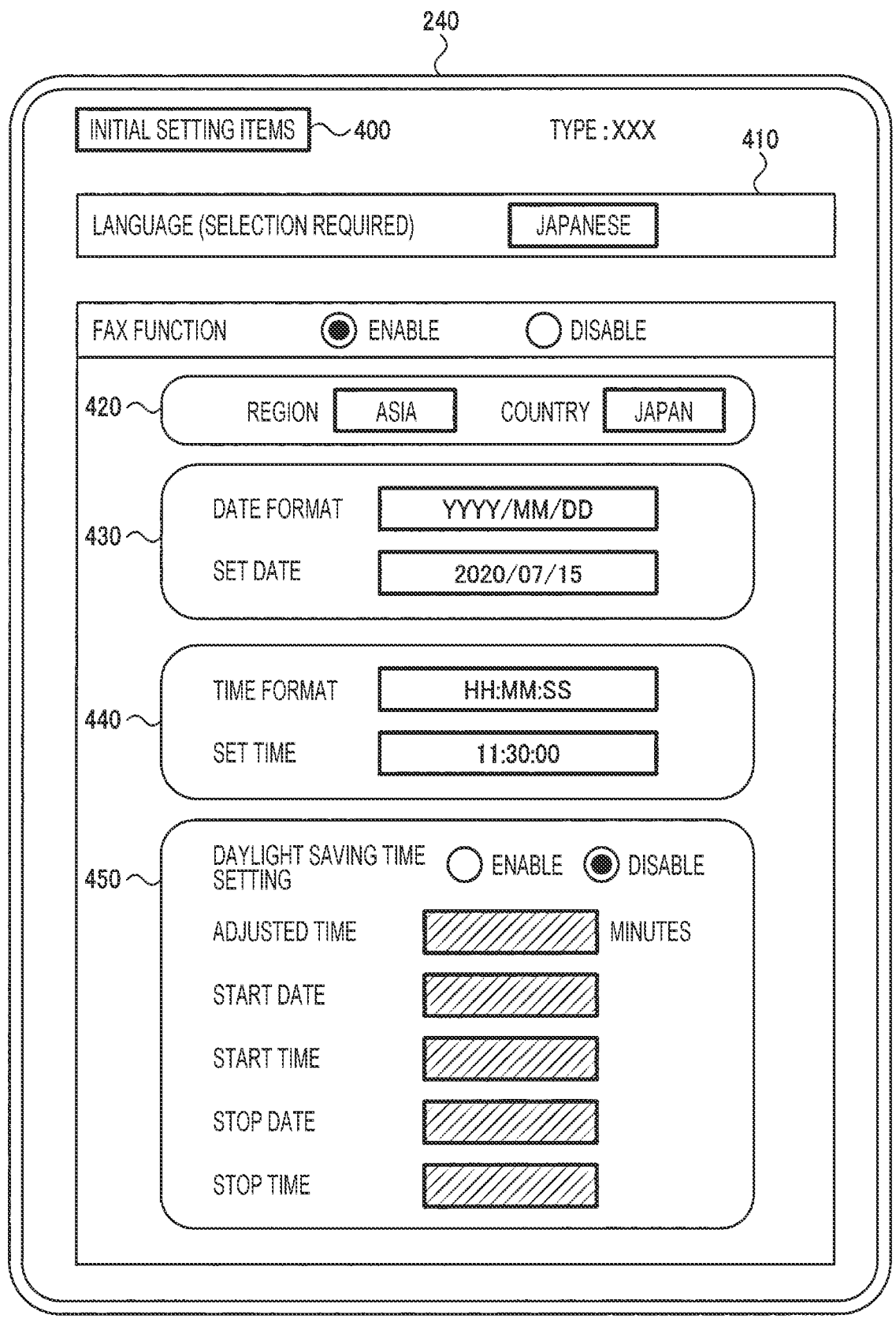
FIG. 6 illustrates a display of initial setting items.

The initial setting information transmission process (step S110) causes, for example, the display section 240 of the information processing apparatus 200 to display an initial setting item screen 400 for the user to enter initial setting information as illustrated in FIG. 6. The initial setting item screen 400 includes, for example, a language selection screen 410, a region selection screen 420, a date selection screen 430, a time selection screen 440, and a daylight saving time setting information selection screen 450, and may also include other screens. In the example in FIG. 6, language is a required item, and other items may also be required items. That is, the initial setting information includes at least one of language, region, date, time, and daylight saving time settings. The processing ensures completion of the initialization process for the electronic apparatus 100 and enables necessary information to be set, thereby increasing the convenience of the electronic apparatus 100. Examples of convenience include that a user is able to select a language and view an error report 600, which will be described later, in the selected language.

The language selection screen 410 is, for example, a screen on which a language can be selected by using a tab;

in FIG. 6, although Japanese is selected, another language, such as English, may be selected.

On the region selection screen 420, a region can be selected by using a tab; in addition, a country may be selected as illustrated in FIG. 6, or only a country may be selected instead of a region. In addition, when a region is selected, only a country of the region may be selected.

On the date selection screen 430, a date format can be selected by using a tab, and a date can be entered in the selected format. The date format is, for example, a format expressing a four-digit year, a two-digit month, and a two-digit day in the Common Era calendar format as illustrated in FIG. 6, but other formats may be selected. Other formats include, for example, a format expressing a two-digit year in the Common Era calendar format, or a format expressing only a year and a month. In FIG. 6, the year is expressed in the Gregorian calendar format, but it may be expressed in the Japanese calendar format.

On the time selection screen 440, a time format can be selected by using a tab, and a time can be entered in the selected format. The time format is, for example, a format expressing a two-digit hour, a two-digit minute, and a two-digit second as illustrated in FIG. 6, but other formats may be selected. Other formats include, for example, a format expressing only hours and minutes. The time format may be a format that uses a.m. and p.m.

On the daylight saving time setting information selection screen 450, a time to be adjusted for the daylight saving time, the date and time at which the adjustment begins, and the date and time at which the adjustment ends can be set. In FIG. 6, the adjusted time can be set in minutes but may be set in hours. The date and time at which the adjustment begins can be entered in the formats set on the date selection screen 430 and the time selection screen 440. The date and time at which the adjustment ends are similarly entered. As illustrated in FIG. 6, "DISABLE" may be selected for the daylight saving time setting. This is because when the electronic apparatus 100 is used in a country that does not employ daylight saving time, this setting is not applicable. When the daylight saving time setting is not selected, no adjusted time can be entered. With this configuration, the initialization process can be simplified.

When date and time are to be set but the facsimile function is not required, adjustment can be made by using optional setting items, which will be described later with reference to FIG. 7. The process of entering the items on the region selection screen 420, the date selection screen 430, the time selection screen 440, and the daylight saving time setting information selection screen 450 may be disabled in a single operation by selecting to disable the facsimile function as illustrated in FIG. 6. With this configuration, the initialization process can be simplified.

Returning to FIG. 5, the description is continued. After performing the initial setting information transmission process (step S110), the processing section 220 in the information processing apparatus 200 determines whether the registration of the initial setting information is complete (step S111). More specifically, a command indicating completion of the registration of the initial setting information is transmitted from the electronic apparatus 100 to the information processing apparatus 200 in an initial setting information completion notification process (step S210), which will be described later with reference to FIG. 9, and the information processing apparatus 200 determines whether the command is received.

When the electronic apparatus 100 completes the initial setting information registration (YES in step S111), the processing section 220 in the information processing apparatus 200 performs the filling instruction information transmission process (step S120) by using the second wireless communication. More specifically, when the electronic apparatus 100 includes the print section 130, a command to fill nozzle portions in the print section 130 with ink is transmitted from the information processing apparatus 200 to the electronic apparatus 100.

It should be noted that when the processing section 120 in the electronic apparatus 100 is not connected to the print section 130 or the mechanism of the print section 130 is not an ink jet print mechanism, the process in step S120 may be omitted. This similarly applies to the processes in step S131, step S132, step S161, step S162, step S221, step S222, step S225, step S226, step S230, step S253, and step S254, which will be described later.

Next, the processing section 220 in the information processing apparatus 200 performs a connection setting information transmission process (step S130) by using the second wireless communication. More specifically, by using the second wireless communication, information required to establish a connection by the use of the first wireless communication is transmitted from the information processing apparatus 200 to the electronic apparatus 100. The required information includes, for example, an SSID and a password for the access point 300 but may include other information. That is, the program according to the embodiment includes the process in step S130 for transmitting, by using the second wireless communication, the connection setting information for causing the electronic apparatus 100 to perform the first wireless communication.

As described above, the program according to the embodiment relates to a program that causes the information processing apparatus 200 to operate as the wireless communication section 210 that is capable of performing the first wireless communication or the second wireless communication that is short-range wireless communication having a slower communication speed than the first wireless communication and to operate as the processing section 220 that performs communication control on the wireless communication section 210. The program includes, by using the second wireless communication, the process in step S101 for connecting to the electronic apparatus 100 by using the second wireless communication, the process in step S110 for transmitting the initial setting information for causing the electronic apparatus 100 to be ready for job processing by using the second wireless communication, and the process in step S130 for transmitting the connection setting information for causing the electronic apparatus 100 to perform the first wireless communication. With this configuration, the initial setting information can be transmitted from the information processing apparatus 200 by using the second wireless communication, which results in fewer connection errors, thereby ensuring completion of the initialization process for the electronic apparatus 100 even if the communication environment of the first wireless communication deteriorates.

When the electronic apparatus 100 does not complete the initial setting information registration (NO in step S111), the processing section 220 in the information processing apparatus 200 performs an error notification process (step S150) and ends the setup process (step S100) without performing a setup completion notification process (step S160), which will be described later. The processes are performed by, for example, displaying content that indicates an initial setting failure on the display section 240 of the information processing apparatus 200. That is, when the initial setting information registration is not complete, the setup of the electronic apparatus 100 fails, and the electronic apparatus 100 cannot be used.

After performing the connection setting information transmission process (step S130), the processing section 220 in the information processing apparatus 200 receives an ink filling completion notification from the electronic apparatus 100 (YES in step S131) and determines whether the setting of the first wireless communication connection is complete (step S133). More specifically, by using the initial setting information transmitted in the process in step S110, the processing section 220 determines whether the electronic apparatus 100 is connected to the information processing apparatus 200 via the access point 300 by using the first wireless communication.

When the setting process of the first wireless communication is complete (YES in step S133), the processing section 220 performs an optional setting information transmission process (step S140). In the optional setting information transmission process (step S140), by using the first wireless communication, optional setting information is transmitted from the information processing apparatus 200 to the electronic apparatus 100. The optional setting information includes, for example, information of paper size, when the electronic apparatus 100 is a printer, and settings for the facsimile function. When the ink filling completion notification is not received from the electronic apparatus 100 (NO in step S131), a process for setting a first notification flag is performed. When the setting of the first wireless communication connection is not complete (NO in step S133), a process for setting a second notification flag is performed.

Figure 7:
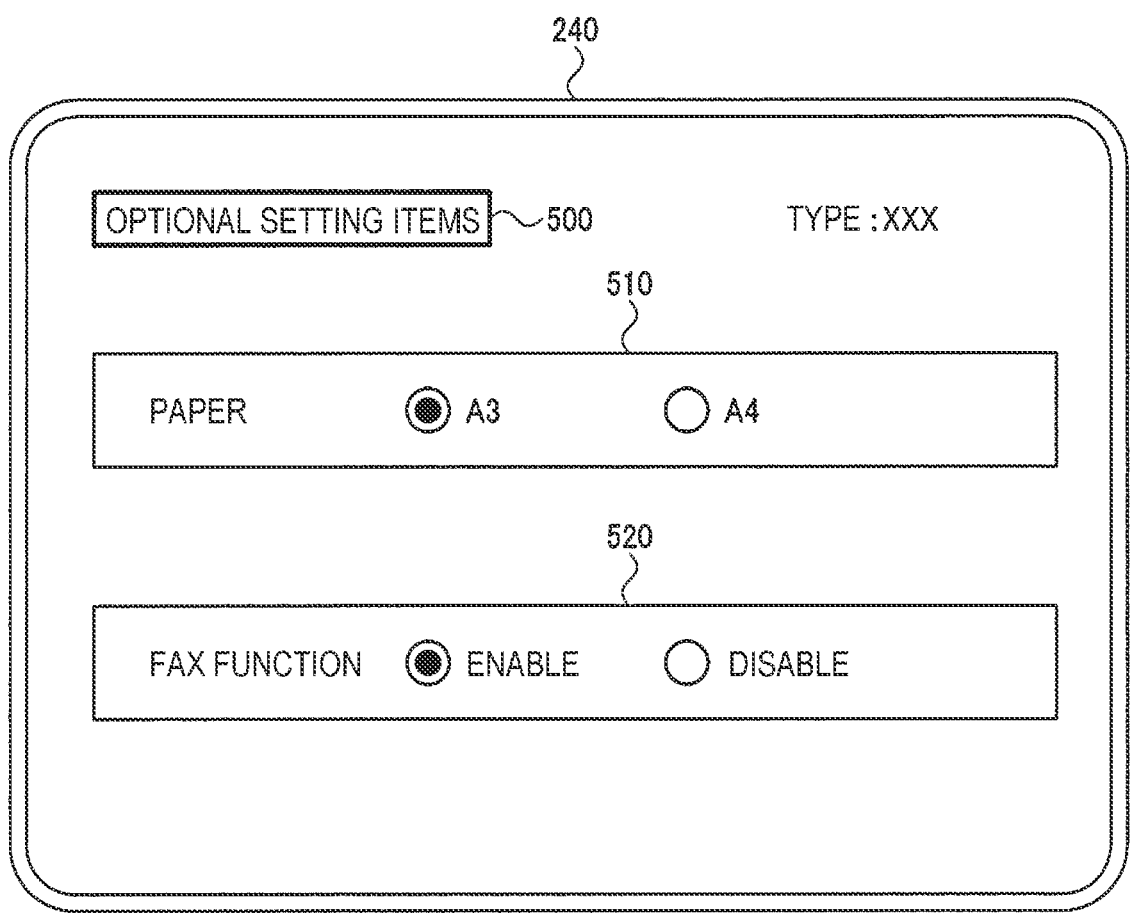
FIG. 7 illustrates a display of optional setting items.

In the optional setting information transmission process (step S140), for example, as illustrated in FIG. 7, the display section 240 displays an optional setting item screen 500, and a predetermined selection operation is performed. The optional setting item screen 500 includes a paper size selection screen 510 and a facsimile function setting screen 520. On the paper size selection screen 510, the user can select A3 or A4 as the paper size. On the facsimile function setting screen 520, the user can enable or disable the facsimile function. It should be noted that the optional setting item screen 500 is not limited to the screen in FIG. 7, and other items may be selected on a screen.

In FIG. 7, on the paper size selection screen 510 and the facsimile function setting screen 520, one of the options is a default setting; however, the initial optional setting item screen 500 may be configured such that no option is selected, and when the information is transmitted in a state in which no selection has been made among optional setting items, an error notification may be generated to prompt the user to select an option.

In FIG. 7, "A3" is selected as a default setting of the paper size, and "ENABLE" is selected as a default setting of the facsimile function. In step S140 in FIG. 7, it is assumed that the user selects "A4" for the paper size and selects "DISABLE" for the facsimile function. With reference FIG. 14, a detailed description will be made later.

Figure 8:
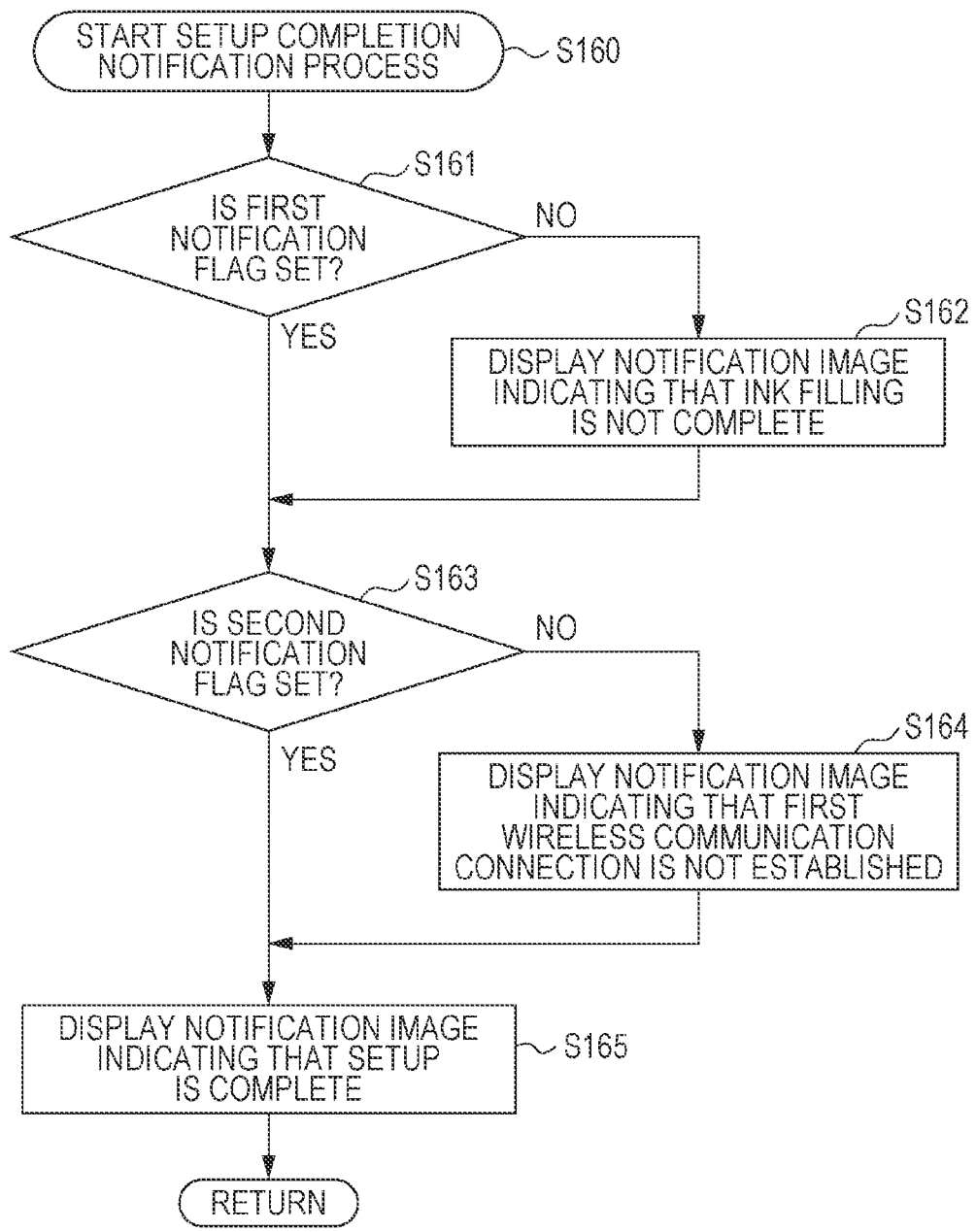
FIG. 8 is a flowchart illustrating example setup completion notification processing.

Returning to FIG. 5, after performing the optional setting information transmission process (step S140), the processing section 220 in the information processing apparatus 200 performs a setup completion notification process (step S160). FIG. 8 is a flowchart illustrating a detailed setup completion notification process (step S160). The processing section 220 in the information processing apparatus 200 determines whether the first notification flag is set (step S161). When the first notification flag is set (YES in step S161), the processing section 220 performs a process of displaying a notification image indicating that ink filling has not been completed (step S162).

Next, the processing section 220 in the information processing apparatus 200 determines whether the second notification flag is set (step S163). When the second notification flag is set (YES in step S163), the processing section 220 performs a process of displaying a notification image indicating that the first wireless communication connection is not established (step S164).

The processing section 220 in the information processing apparatus 200 performs a process of displaying a notification image indicating that the setup process is complete and the electronic apparatus 100 is ready for use (step S165) and ends the setup completion notification process (step S160). The processing enables the notification image formed in step S162, the notification image formed in step S164, and the notification image formed in step S165 to be displayed together on the display section 240. The incomplete ink filling and the unestablished first wireless communication connection do not affect completion of the setup process of the electronic apparatus 100, and thus an indication that the ink filling has not been completed and the first wireless communication connection is not established is displayed when the setup process is complete.

Next, the initialization process (step S200) is described with reference to FIG. 9 and other drawings. The processing section 120 in the electronic apparatus 100 determines whether the second wireless communication connection is established (step S201). When the second wireless communication connection is established (YES in step S201), the processing section 120 determines whether the initial setting information is received (step S202). In FIG. 9, when the processing section 120 determines that the second wireless communication connection is not established (NO in step S201), the process in step S201 is repeated until the second wireless communication connection is established; however, after a predetermined time has elapsed, an error notification may be issued and the initialization process (step S200) may be ended.

When the initial setting information is received (YES in step S202), the processing section 120 in the electronic apparatus 100 performs an initial setting information registration process (step S203). More specifically, a process of storing the received initial setting information in a storage section (not illustrated) is performed. When the initial setting information registration process is complete (YES in step S204), the processing section 120 performs an initial setting information registration completion notification process (step S210). More specifically, a process of transmitting a command to the information processing apparatus 200 indicating that the initial setting information is stored in the storage section (not illustrated) is performed. When the initial setting information registration is not completed due to a certain condition (NO in step S204), the processing section 120 performs a process of setting a first error flag (step S205) and performs an error process (step S250), which will be described later. The certain condition includes, for example, a condition in which the initial setting information has not been stored due to a memory failure in the storage section; however, such a condition is not assumed under normal conditions. After performing the initial setting information registration completion notification process (step S210), the processing section 120 in the electronic apparatus 100 performs a predetermined setting process (step S220).

Next, an example of the predetermined setting process (step S220) is described with reference to FIG. 10. As described above, at the start of the predetermined setting process (step S220), the electronic apparatus 100 and the information processing apparatus 200 are connected by only the second wireless communication. After determining that the filling instruction information is received (YES in step S221), the processing section 120 in the electronic apparatus 100 performs an ink filling start process (step S222). More specifically, when the print section 130 includes a print mechanism having an ink jet discharge head, the processing section 120 performs a process for filling the discharge head nozzles with ink. Then, when the processing section 120 in the electronic apparatus 100 determines that the connection setting information is received (YES in step S223), the processing section 120 performs a first wireless communication connection process (step S224). More specifically, the processing section 120 performs a process of joining a wireless network of the access point 300 by using the received connection setting information. That is, by using the second wireless communication, the processing section 120 according to the embodiment receives the filling instruction information for filling the print section 130 with ink from the information processing apparatus, and after the ink filling is started in accordance with the filling instruction information, the processing section 120 initiates the setting for the first wireless communication in accordance with the connection setting information. The processing enables the ink filling process to be started for the print section 130 before the connection to the first wireless communication is established, thereby reducing the time from establishing the first wireless communication connection to completion of the ink filling. Accordingly, the initialization process for the electronic apparatus 100 can be completed reliably, and the convenience of the electronic apparatus 100 can be increased.

Figure 10:
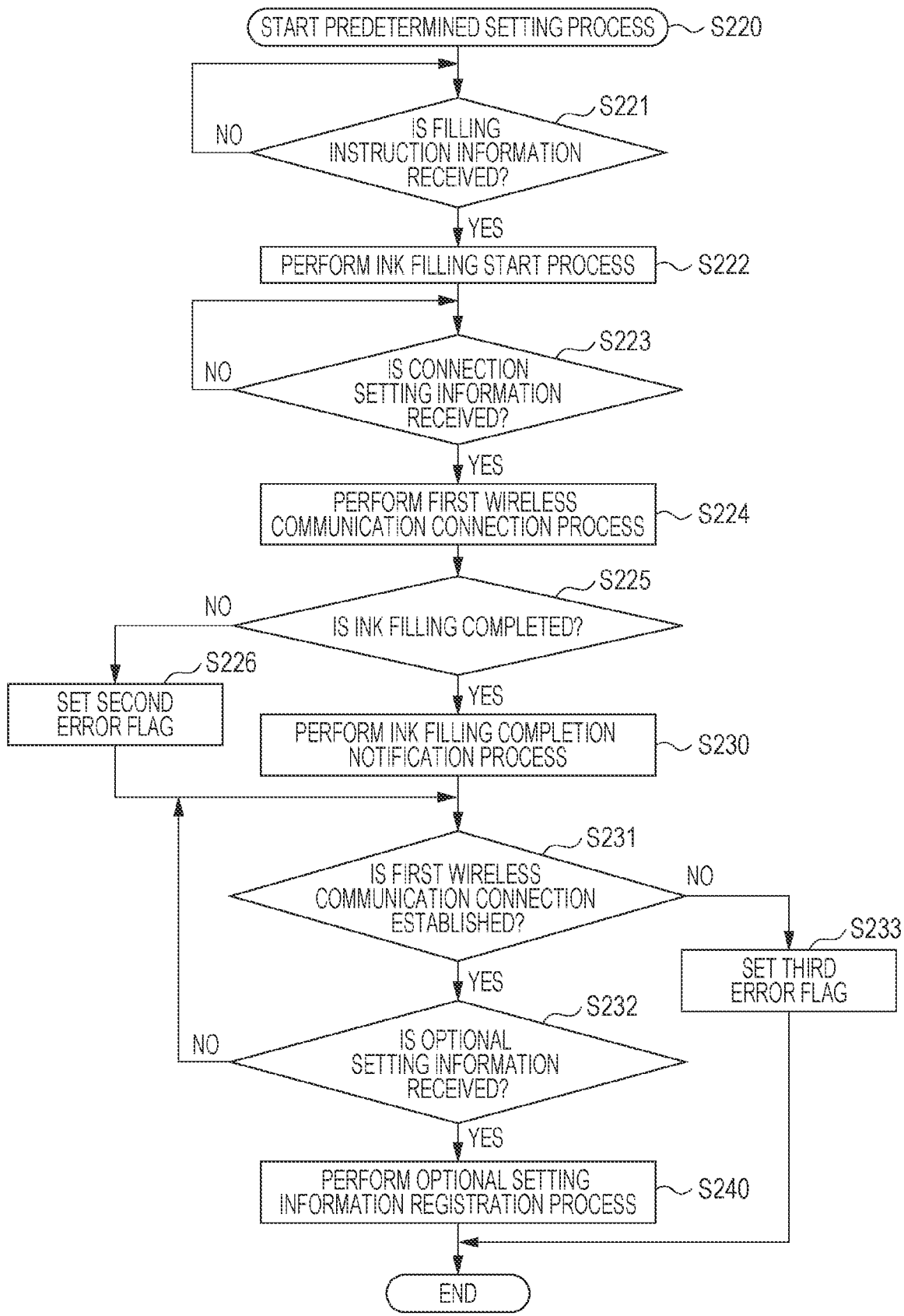
FIG. 10 is a flowchart illustrating example predetermined setting processing.

In FIG. 10, when it is determined that the filling instruction information is not received (NO in step S221), the process in step S221 is repeated until the filling instruction information is received; however, after a predetermined time has elapsed, a process of setting a second error flag (step S226), which will be described later, may be performed. Similarly, when it is determined that the connection setting information is not received (NO in step S223), the process in step S223 is repeated until the connection setting information is received; however, after a predetermined time has elapsed, a process of setting a third error flag (step S233), which will be described later, may be performed. It should be noted that since the connection using the second wireless communication is more stable than the connection using the first wireless communication, it is assumed that the filling instruction information and the connection setting information can be received under normal conditions.

After performing the first wireless communication connection process (step S224), the processing section 120 in the electronic apparatus 100 determines whether the ink filling process is complete (step S225). More specifically, although illustration is omitted, the processing section 120 performs, for example, a process of determining whether a signal indicating an ink filling completion is received from a sensor provided in the vicinity of the discharge head nozzles of the print section. When the ink filling process is complete (YES in step S225), the processing section 120 performs an ink filling completion notification process (step S230). More specifically, a command indicating that the ink filling process is complete is transmitted from the electronic apparatus 100 to the information processing apparatus 200.

When the ink filling has not been completed (NO in step S225), the processing section 120 performs a process of setting the second error flag (step S226).

Next, the processing section 120 in the electronic apparatus 100 performs a process of determining whether the first wireless communication connection is established (step S231). When the first wireless communication connection is established (YES in step S231), the processing section 120 performs a process of determining whether the optional setting information described with reference to FIG. 7 is received (step S232). When the first wireless communication connection is not established, the processing section 120 performs a process of setting the third error flag (step S233) and ends the predetermined setting process (step S220) without performing an optional setting information registration process (step S240), which will be described later.

When the optional setting information is received (YES in step S232), the processing section 120 in the electronic apparatus 100 performs the optional setting information registration process (step S240) and ends the flow. More specifically, a process of storing the received optional setting information in a storage section (not illustrated) is performed. When the optional setting information is not received (NO in step S232), the processing section 120 again performs the process of determining whether the first wireless communication connection is established (step S231).

Figure 11:
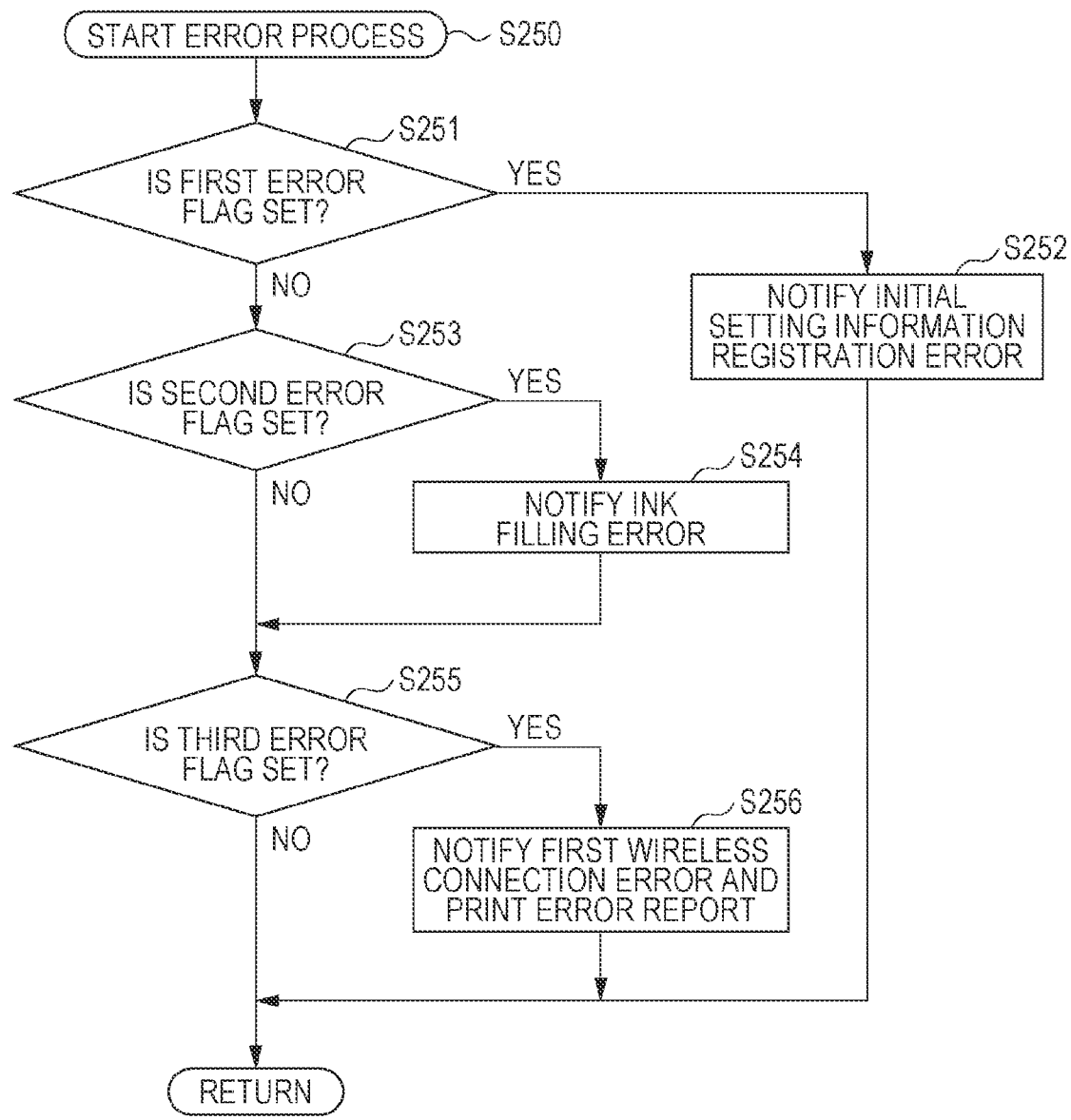
FIG. 11 is a flowchart illustrating example error processing.

Next, the error process (step S250) that is performed after the predetermined setting process (S220) is complete is described with reference to FIG. 11. The processing section 120 in the electronic apparatus 100 performs a process of determining whether the first error flag is set (step S251). When the first error flag is set (YES in step S251), the processing section 120 performs a process of providing a notification of an initial setting information registration error (step S252) and ends the flow. More specifically, a process of displaying a predetermined image on the display section 140 is performed; however, the notification may be made by the use of other methods such as blinking or switching on a predetermined lamp. As described above with reference to FIG. 9, when the first flag is set, the predetermined setting process (step S220) is not performed, and thus it is not necessary to consider the second error flag and the third error flag, which will be described later.

When the first error flag is not set (NO in step S251), the processing section 120 in the electronic apparatus 100 performs a process of determining whether the second error flag is set (step S253). When the second error flag is set (YES in step S253), the processing section 120 performs a process of notifying the user about an ink filling error (step S254). More specifically, a process of indicating on the display section 140 that the ink filling has not been completed is performed; however, the indication may be made by the use of other methods such as blinking or switching on a predetermined lamp in the electronic apparatus 100.

Next, the processing section 120 in the electronic apparatus 100 performs a process of determining whether the third error flag is set (step S255). When the third error flag is set (YES in step S255), that is, when the first wireless communication connection is not established, the processing section 120 performs a process of notifying the user about an occurrence of a first wireless communication connection error (step S256). More specifically, the processing section 120 performs an error notification for notifying the user that the first wireless communication connection is not established and about the cause of the error. The cause of the error is, for example, the above-mentioned mismatch between the SSID and the password but may include other causes. That is, when an error occurs in setting the first wireless communication in accordance with connection setting information, the processing section 120 performs the process of notifying the user about the connection guide of the first wireless communication. The processing ensures completion of the initialization process of the electronic apparatus 100 and enables the user to be informed of the error in the first wireless communication connection, thereby enabling quick completion of the other setting processes of the electronic apparatus 100.

Figure 12:
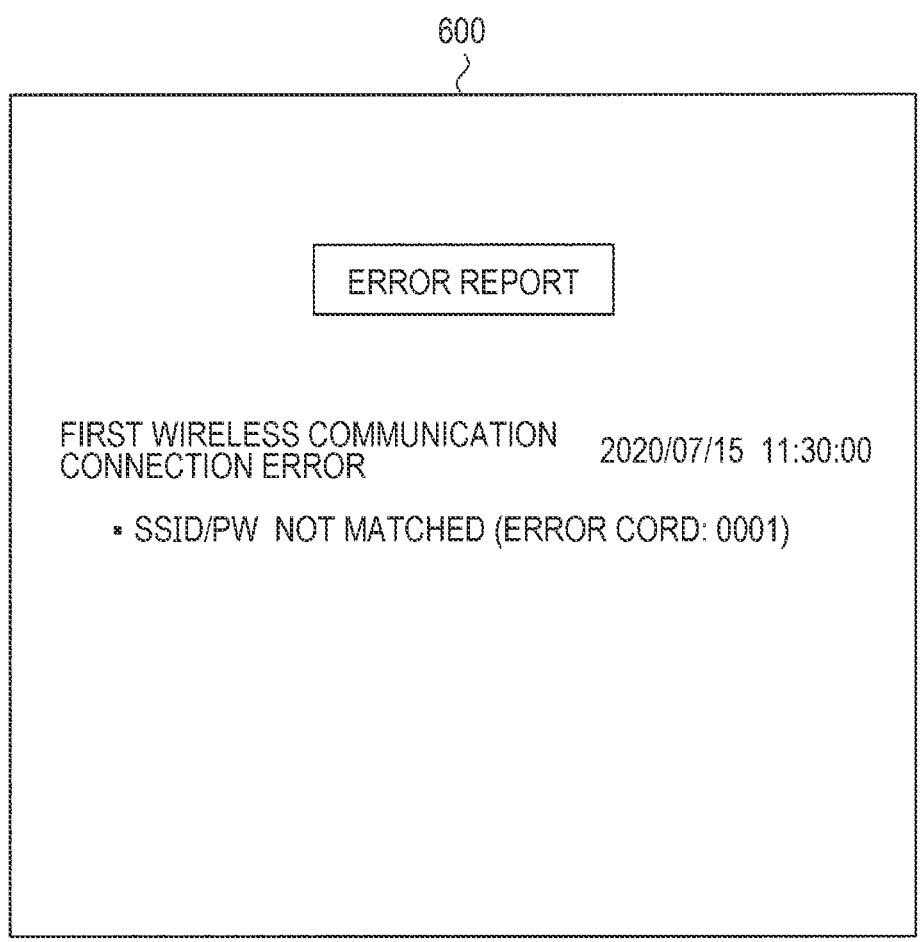
FIG. 12 illustrates an error report.

In step S256, the processing section 120 in the electronic apparatus 100 performs the above-described process and a process of printing an error report 600. After the initial setting registration completion notification process (step S210) is performed, the electronic apparatus 100 is ready for use, and when the electronic apparatus 100 is connected to the print section 130, the processing section 120 can perform a process of printing the error report 600 as illustrated in FIG. 12. Under a predetermined condition, the error report 600 may be printed by operating an operation section (not illustrated) after the initialization process (step S200) is complete. The predetermined conditions are conditions not suitable for the output of the error report 600, for example, when the second error flag is set (YES in step S253), that is, when the ink filling has not been completed, when paper is not set, or the like. That is, when an error occurs in setting the first wireless communication in accordance with the connection setting information, by executing the initialization process in accordance with the initial setting information, the processing section 120 performs the process of printing the connection status by using the print section 130 after the print section 130 becomes ready for processing a print job. The processing ensures completion of the initialization process for the electronic apparatus 100 and enables the user to be informed of the error in the first wireless communication connection by the use of the print section 130, thereby enabling early completion of the other setting processes for the electronic apparatus 100.

The processing section 120 in the electronic apparatus 100 performs a process of ending the error processing when the third error flag is not set (NO in step S255). That is, when none of the first error flag, the second error flag, and the third error flag are set, the flow ends without performing any processing. The processing ends the initialization process (step S200).

Figure 13:
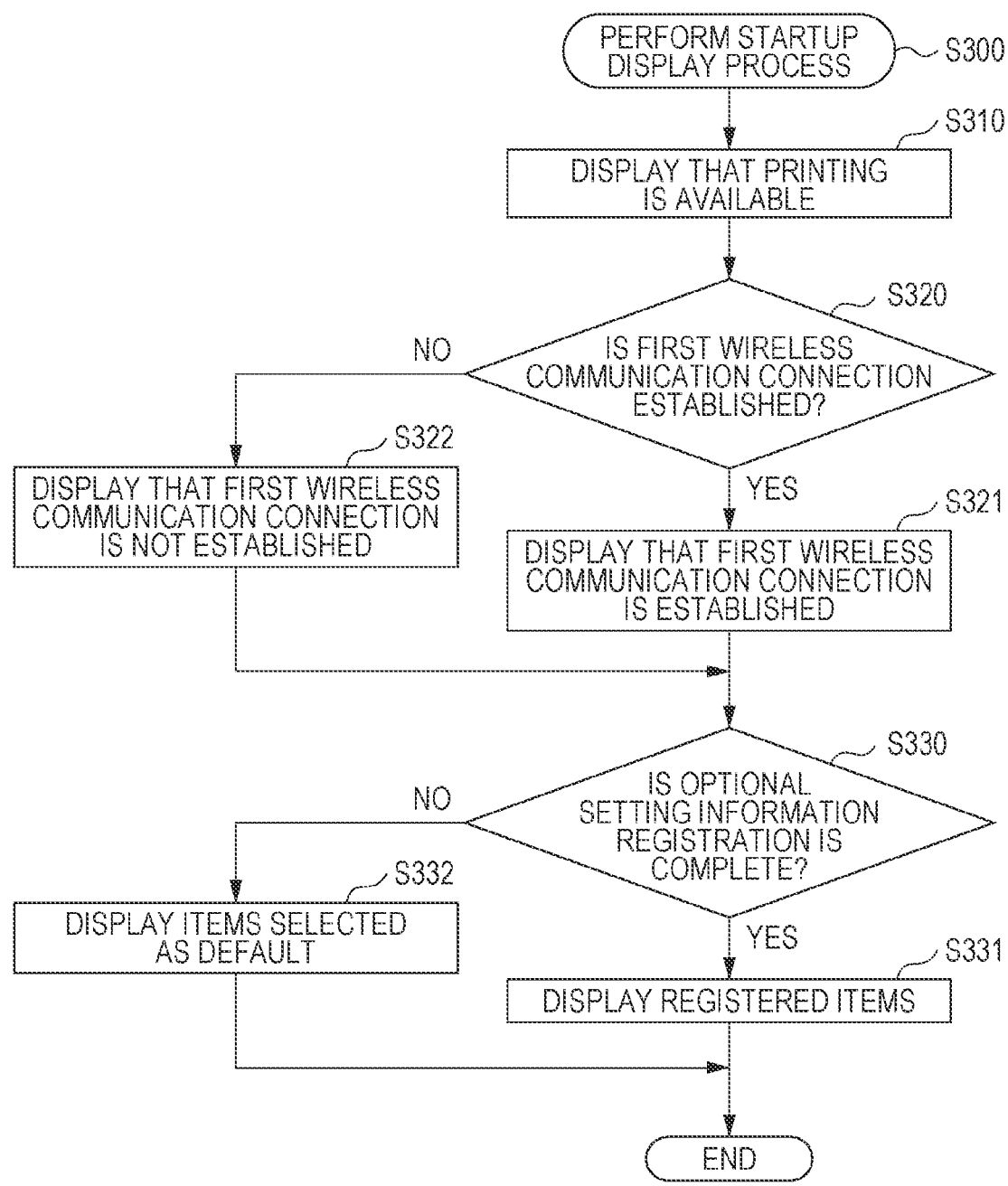
FIG. 13 is a flowchart illustrating example startup display processing.
Figure 14:
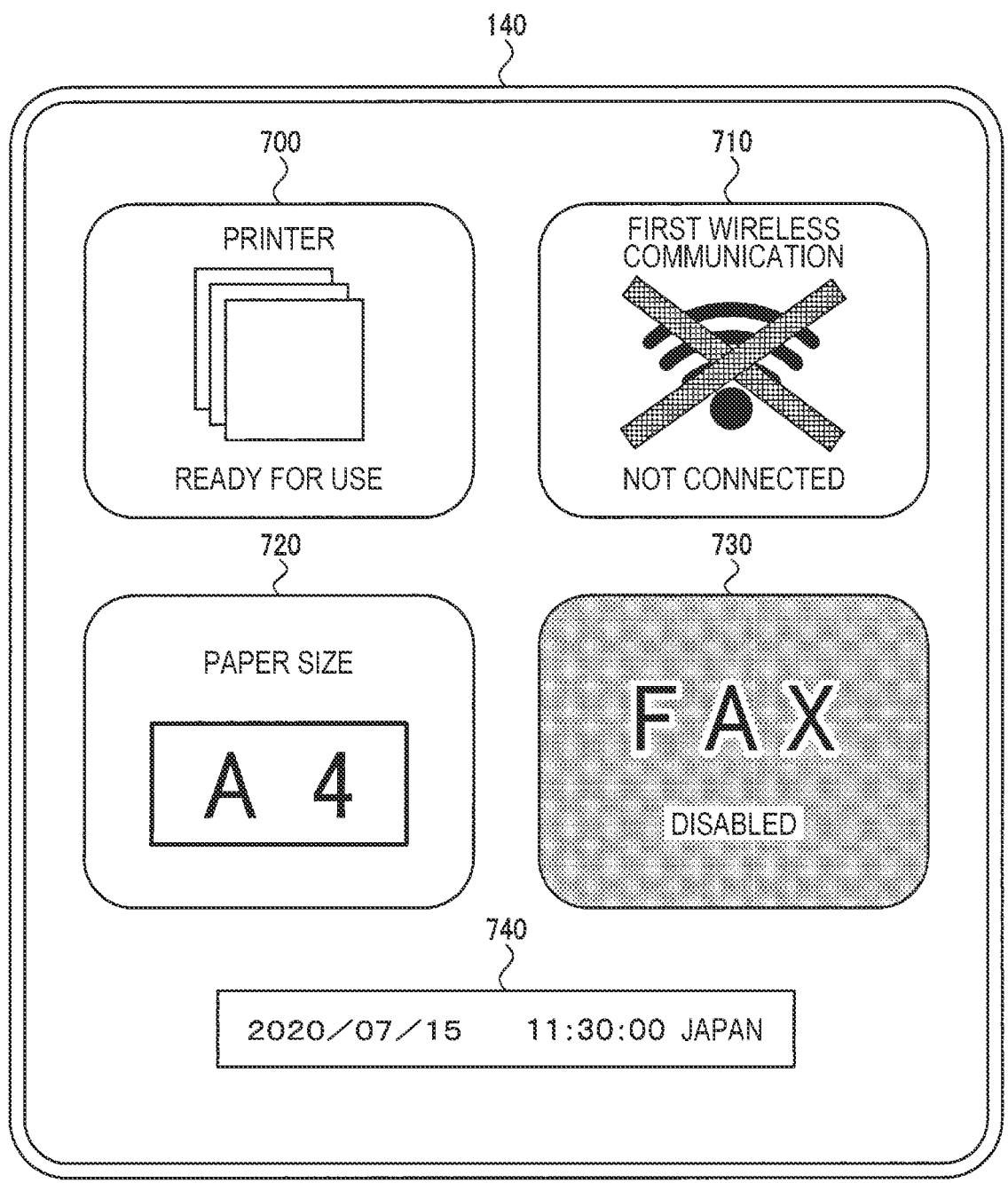
FIG. 14 illustrates a display after electronic apparatus startup.

Next, an example of the startup display process (step S300) is described with reference to FIG. 13. As described above, the startup display process (step S300) is performed when the electronic apparatus 100 is ready for use. The processing section 120 in the electronic apparatus 100 performs a process of displaying that the electronic apparatus 100 is ready for use (step S310). More specifically, when the electronic apparatus 100 is a printer, the processing section 120 performs, for example, a process of switching a printer ready/not ready icon 700 to an indication that the printer is ready for use and displaying the icon 700 on the display section 140 as illustrated in FIG. 14.

Next, the processing section 120 in the electronic apparatus 100 performs a process of determining whether the first wireless communication connection is established (step S320). When the first wireless communication connection is established (YES in step S320), the processing section 120 performs a process of displaying that the first wireless communication connection is established (step S321). When the first wireless communication connection is not established (NO in step S320), the processing section 120 performs a process of displaying that the first wireless communication connection is not established (step S322). More specifically, the processing section 120 performs, for example, a process of switching a first wireless communication state icon 710 in FIG. 14 to an indication that the first wireless communication connection is established or an indication that the first wireless communication connection is not established and a process of displaying the icon 710 on the display section 140. An example of the first wireless communication state icon 710 illustrated in FIG. 14 indicates that the first wireless communication connection is not established.

Next, the processing section 120 in the electronic apparatus 100 performs a process of determining whether the registration of optional setting items is complete (step S330). When the registration of optional setting items is complete (YES in step S330), for example, in step S240, the processing section 120 performs a process of displaying the optional setting items on the display section 140 as registered (step S321). When the registration of optional setting items is not complete (NO in step S320), the processing section 120 performs a process of displaying the optional setting items selected as default on the display section (step S322). More specifically, in step S140 in FIG. 5, as described above, the user has selected "A4" for the paper size and "DISABLE" for the facsimile function, and thus a paper size icon 720 indicating that "A4" is selected is displayed on the display section 140 in FIG. 14. Similarly, a facsimile setting icon 730 indicating that the facsimile is disabled is displayed on the display section 140.

It should be noted that a time display icon 740 may also be displayed on the display section 140. With the time display icon 740, even if the facsimile function is not used, the date and time and the region can be displayed, thereby increasing the convenience of the electronic apparatus 100.

As described above, displaying the printer ready/not ready icon 700, the first wireless communication state icon 710, the paper size icon 720, the facsimile setting icon 730, and the time display icon 740 on the display section 140 enables the initial settings to be visually presented. Accordingly, the user can readily check the initial setting conditions, which increases the convenience of the electronic apparatus 100.

As described above, the electronic apparatus according to the embodiment relates to an electronic apparatus that includes a wireless communication section configured to perform first wireless communication or second wireless communication that is short-range wireless communication having a slower communication speed than the first wireless communication and includes a processing section configured to perform communication control on the wireless communication section and perform control on job processing. The processing section connects to an information processing apparatus for communication by using the second wireless communication to receive initial setting information for setting a state to enable the job processing and receive connection setting information for connecting to an external access point by using the first wireless communication.

With this configuration, the initial setting information is received from the information processing apparatus by using the second wireless communication, which results in fewer connection errors, thereby ensuring completion of the initialization process for the electronic apparatus even if the communication environment of the first wireless communication deteriorates. Accordingly, the job can be processed by using the method other than the first wireless communication applied to the electronic apparatus, thereby increasing the convenience of the electronic apparatus.

The processing section may receive the connection setting information after performing an initialization process in accordance with the initial setting information.

The processing enables the initialization process for the electronic apparatus to be performed before the connection process of the first wireless communication, which tends to result in more connection errors, is performed, thereby ensuring completion of the initialization process for the electronic apparatus.

The electronic apparatus may further include a print section, in which the processing section, by using the second wireless communication, receives filling instruction information for filling the print section with ink from the information processing apparatus, and after the ink filling process is started in accordance with the filling instruction information, starts a process of setting the first wireless communication in accordance with the connection setting information.

The processing enables the ink filling process to be started for the print section before the connection to the first wireless communication is established, shortening the time from the establishment of the first wireless communication connection to the ink filling completion. Accordingly, the initialization process for the electronic apparatus can be completed reliably, and the convenience of the electronic apparatus can be increased.

The electronic apparatus may further include a print section, in which the processing section, when an error occurs in setting the first wireless communication in accordance with the connection setting information, performs a process of printing a connection status by using the print section after the print section becomes ready for processing a print job by the execution of the initialization process in accordance with the initial setting information.

The processing ensures completion of the initialization process for the electronic apparatus and enables the user to be informed of the error in the first wireless communication connection by the use of the print section, enabling early completion of the other setting processes for the electronic apparatus.

The processing section, when an error occurs in setting the first wireless communication in accordance with the connection setting information, may perform a process of notifying the user about a connection guide of the first wireless communication.

The processing ensures completion of the initialization process for the electronic apparatus and enables the user to be informed of the error in the first wireless communication connection, enabling early completion of the other setting processes for the electronic apparatus.

The initial setting information may include at least one of language, region, date, time, and daylight saving time settings.

The configuration ensures completion of the initialization process for the electronic apparatus and enables necessary information to be set, thereby increasing the convenience of the electronic apparatus.

After the processing section is connected to the access point by using the first wireless communication in accordance with the connection setting information, the processing section may receive optional setting information about setting items different from the initial setting information by using the first wireless communication.

The processing ensures completion of the initialization process for the electronic apparatus and enables more information to be set by using the first wireless communication, thereby increasing the convenience of the electronic apparatus.

The processing section may control the job data reception by using not the second wireless communication but the first wireless communication.

The processing ensures completion of the initialization process for the electronic apparatus and enables the job data transmission by using the first wireless communication that is faster in communication speed, thereby increasing the convenience of the electronic apparatus.

A non-transitory computer-readable storage medium storing a program according to the embodiment relates to a program for causing an information processing apparatus to operate as a wireless communication section that performs first wireless communication or second wireless communication that is short-range wireless communication having a slower communication speed than the first wireless communication and as a processing section that performs communication control on the wireless communication section. The program includes connecting to an electronic apparatus by using the second wireless communication, transmitting, by using the second wireless communication, initial setting information for causing the electronic apparatus to be ready for job processing, and transmitting, by using the second wireless communication, connection setting information for causing the electronic apparatus to perform the first wireless communication.

With this configuration, the initial setting information is transmitted by using the second wireless communication, which results in fewer connection errors, by operating the information processing apparatus, thereby ensuring completion of the initial setting for the electronic apparatus even if the communication environment of the first wireless communication deteriorates.

Although the embodiments have been described in detail above, a person skilled in the art will readily understand that various modifications can be made without departing from the scope of the present disclosure. Consequently, all modifications are included within the scope of the present disclosure. For example, in the specification or drawings, terms used at least once together with broader or equivalent different terms can be replaced with the different terms at any part in the specification or drawings. In addition, any combination of the embodiments and modifications is included in the scope of the present disclosure. The configurations and operations of the electronic apparatus, program, and the like are not limited to the embodiments, and various modifications may be made.

What is claimed is:

1. An electronic apparatus comprising:
   a wireless communication section configured to perform first wireless communication or second wireless communication that is short-range wireless communication having a slower communication speed than the first wireless communication;
   a print section; and
   a processor configured to perform communication control on the wireless communication section and perform control on job processing, wherein
   the processor connects to an information processing apparatus for communication by using the second wireless communication to receive initial setting information for setting a state for enabling the job processing and receive connection setting information for connecting to an external access point by using the first wireless communication, the processor, by using the second wireless communication, receives filling instruction information to initially fill nozzles of the print section with ink from the information processing apparatus, the filling instructions being received by the processor before the processor receives a print job, and after the ink filling process is started in accordance with the filling instruction information, starts a process of setting the first wireless communication in accordance with the connection setting information.

2. The electronic apparatus according to claim 1, wherein the processor receives the connection setting information after performing an initialization process in accordance with the initial setting information.

3. The electronic apparatus according to claim 1, further comprising:

a print section, wherein the processor, when an error occurs in setting the first wireless communication in accordance with the connection setting information, performs a process of printing a connection status by using the print section after the print section becomes ready for processing a print job due to the initialization process being executed in accordance with the initial setting information.

4. The electronic apparatus according to claim 1, wherein the processor, when an error occurs in setting the first wireless communication in accordance with the connection setting information, performs a process of notifying the user about a connection guide of the first wireless communication.

5. The electronic apparatus according to claim 1, wherein the initial setting information includes at least one of language, region, date, time, and daylight saving time settings.

6. The electronic apparatus according to claim 1, wherein, after the processor is connected to the access point by using the first wireless communication in accordance with the connection setting information, the processor receives optional setting information about setting items different from the initial setting information by using the first wireless communication.

7. The electronic apparatus according to claim 1, wherein, the processor controls the job data reception by using the first wireless communication instead of the second wireless communication.

8. A non-transitory computer-readable medium storing a program for causing an information processing apparatus to operate as a wireless communication section that performs first wireless communication or second wireless communication that is short-range wireless communication having a slower communication speed than the first wireless communication and to operate as a processor that performs communication control on the wireless communication section, the program comprising:

connecting to an electronic apparatus by using the second wireless communication;

transmitting, by using the second wireless communication, initial setting information for causing the electronic apparatus to be ready for job processing;

transmitting, by using the second wireless communication and from the information processing apparatus, filling instruction information to initially fill nozzles of a print section with ink, the filling instructions being received by the processor before the processor receives a print job, and after the ink filling process is started in accordance with the filling instruction information, transmitting, by using the second wireless communication, connection setting information for causing the electronic apparatus to perform the first wireless communication.

* * * * *